Figure 1:
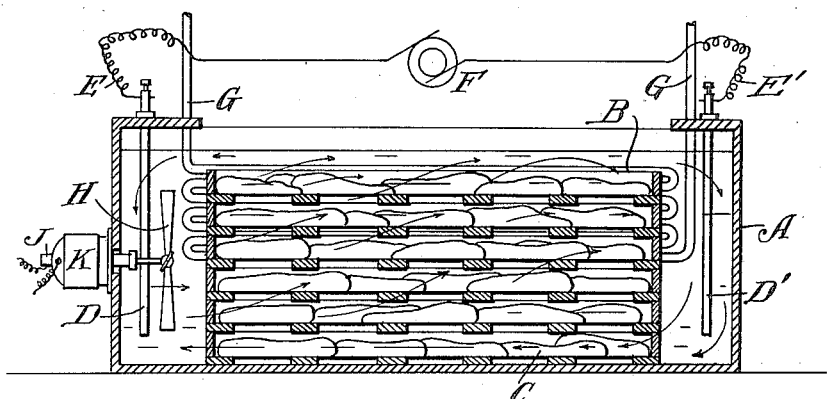

J. L. MAULDIN.
PRESERVING APPARATUS.
APPLICATION FILED DEC. 1, 1910.

1,057,567.

Patented Apr. 1, 1913.

WITNESSES:
Brennan B. West.
Oliver M. Kappler.

INVENTOR,
James L. Mauldin
By Albert H. Bates,
ATTY.

UNITED STATES PATENT OFFICE.

JAMES L. MAULDIN, OF CLEVELAND, OHIO, ASSIGNOR TO THE ELECTRIC MEAT CURING COMPANY, OF CLEVELAND, OHIO, A CORPORATION OF MAINE.

PRESERVING APPARATUS.

1,057,567.

Specification of Letters Patent.

Patented Apr. 1, 1913.

Application filed December 1, 1910. Serial No. 595,074.

*To all whom it may concern:*

Be it known that I, JAMES L. MAULDIN, a citizen of the United States, residing at Cleveland, in the county of Cuyahoga and State of Ohio, have invented a certain new and useful Improvement in Preserving Apparatus, of which the following is a full, clear, and exact description, reference being had to the accompanying drawings.

In the preserving of meat, or other substances, by soaking the same in brine, the preserving action is hastened by passing an electric current through the brine and substances. Such electric current tends to heat the brine and it has been found necessary to artificially cool it to counteract this heat tendency.

The object of this invention is to provide a simple and efficient means for cooling the brine directly in the curing tank, and furthermore, for agitating the brine so that fresh, cool brine is continuously presented to the substance being cured.

I accomplish the above object by providing a cooling coil in the cooling tank and means for causing the brine to circulate in the tank so that a uniform low temperature is maintained. I cause this circulation both thermodynamically and mechanically. That is to say, I arrange my cooling coils within the tank so that the cooling action thereof on the immediately adjacent brine tends to cause the same to circulate in the up and down course within the tank, and furthermore, I provide a propeller within the tank causing such brine to circulate longitudinally in the tank. The result of these operations is that the various particles of the brine are successively presented to the cooling coil and successively presented to the substance being cured, so that a uniform temperature of brine is maintained and the substance being cured is constantly surrounded by a cooled brine, notwithstanding the heating of such brine by the passage of electric current through it.

The drawing clearly illustrates my apparatus.

Figure 2:
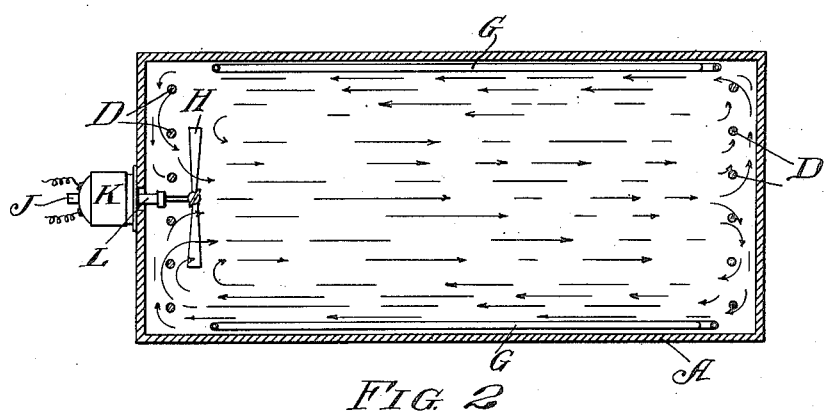
Figure 3:
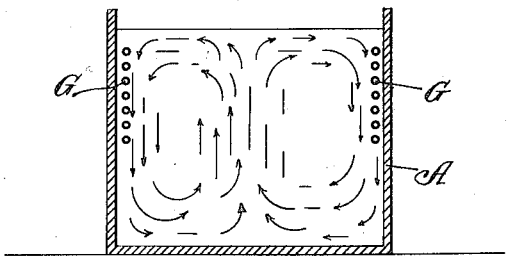

Figure 1 is a longitudinal vertical section through the same; Fig. 2 is a horizontal section; and Fig. 3 is a transverse vertical section.

As shown in the drawings, A represents a suitable longitudinal tank; B racks therein, one surmounting another, and C pieces of meat or other substance to be cured carried by the racks.

D and D' represent sets of electrodes in the tank, which are terminals of lines E and E' supplying electric current passing through the tank. This current may be direct or alternating, as desired, though, if direct current is used, suitable means must be provided for preventing the contamination due to electrolysis. I have illustrated at F an alternating current generator for supplying current passing through the brine and substance being cured.

To cool the brine and substance being cured I provide within the tank A suitable coils G, G of pipe adapted to carry cooling medium as, for example, compressed ammonia gas. I locate these coils along the upper portion of the sides of the tank. Their tendency is to cool the brine immediately adjacent to them, and such cold brine accordingly descends, causing an upward current of brine intermediately of the tank, so that the brine circulates within the tank in a continuous course downwardly near the sides of the tank and upwardly near the center, as indicated by the arrows in Fig. 3. To further agitate and circulate the brine, I provide, near one end of the tank, a suitable propeller H which is adapted to be suitably rotated. As shown, the shaft J of this propeller is the armature shaft of a suitable motor K mounted outside the tank, such shaft extending through a water tight stuffing box L. The rotation of this propeller shoves forwardly the brine near the central portion of the tank, causing it to return along paths near the sides, as illustrated by the arrows in Fig. 20. The result of the two courses of circulation described is to cause the brine to travel diagonally upwardly and lengthwise of the tank at the central portion and downwardly and lengthwise in the opposite direction along the cooling pipes. Accordingly, all portions of the brine are presented to the cooling pipes and these pipes are thereby adapted to take up the heat caused by the passage of electric current and maintain the brine uniformly cool and the cooled brine, circulating rapidly across the substance being cured, maintains it at the proper temperature.

The cooling pipes G have their outer walls of some substance which is a non-conductor for the electric current. The pipe may be entirely of a non-metallic substance, as glass or porcelain, but to endow the pipes with the requisite strength to withstand breakage and also to enable them to take up the heat rapidly, I prefer to make them of metallic substance with a thin vitrified coating as, for example, porcelainized iron.

Having thus described my invention what I claim is:—

1. In an apparatus for preserving, the combination, of a tank, cooling coils within the tank arranged on opposite sides thereof and confined to the upper portion of such sides to not only cool the medium but to circulate it, and racks between the coils.

2. In a preserving apparatus, the combination of a tank, coils of cooling pipe on opposite sides of the tank, surmounting trays between the coils, and a rotary propeller near one end of the tank beyond the trays.

3. In a preserving apparatus, the combination of a tank, intermediately located racks therein adapted to sustain the articles to be preserved, a propeller within the tank beyond the racks, a motor for the propeller on the outside of the tank, and a driving connection between the motor and propeller.

4. In a preserving apparatus, the combination of a tank, intermediately located racks therein adapted to carry the articles to be preserved, coils of cooling pipe on the upper portion of opposite sides of the tank, a propeller within the tank near one end, and means for rotating the propeller.

In testimony whereof, I hereunto affix my signature in the presence of two witnesses.

JAMES L. MAULDIN.

Witnesses:
ALBERT H. BATES,
BRENNAN B. WEST.